United States Patent Office 3,312,245
Patented Apr. 4, 1967

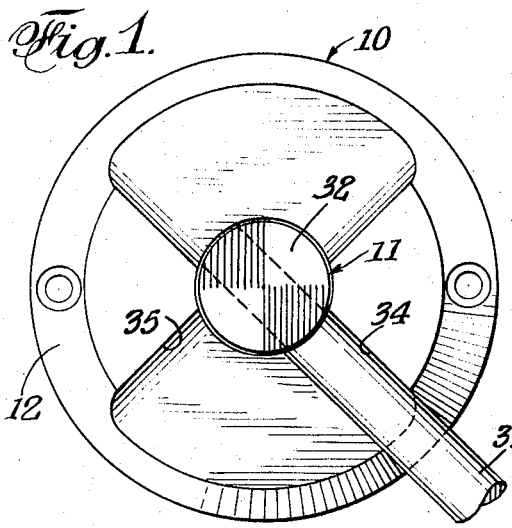
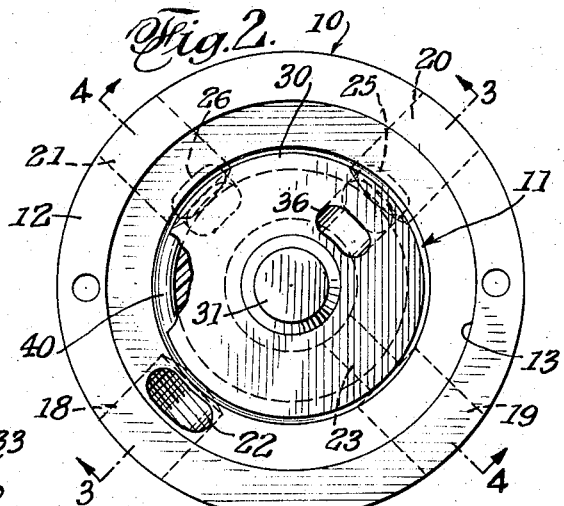
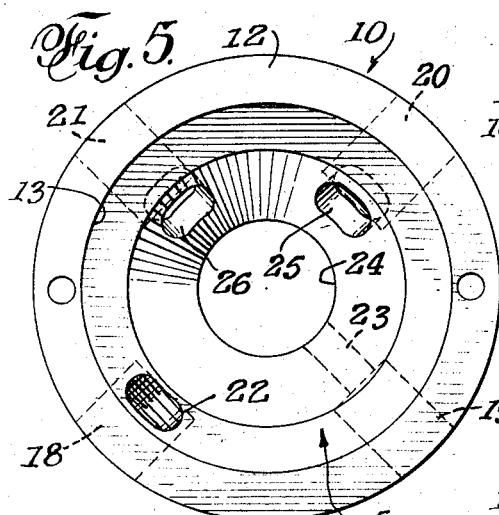
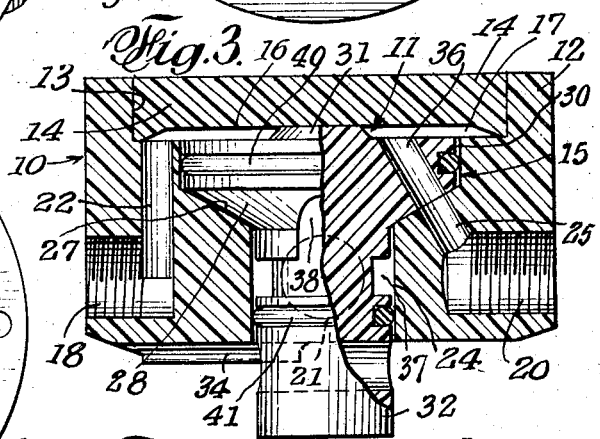
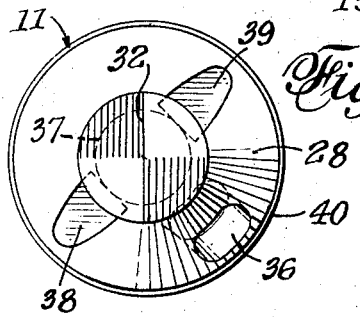
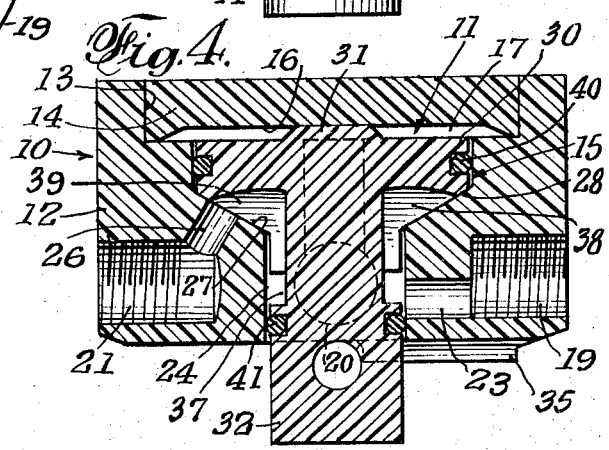
INVENTOR.
JOHN B. REILLY
BY C. G. Stratton
ATTORNEY

3,312,245
MULTIPLE PORT VALVE
John B. Reilly, 740 E. Edgehill, Whittier, Calif. 90601
Filed July 6, 1965, Ser. No. 469,606
7 Claims. (Cl. 137—625.23)

This invention relates to a four-port, four-way valve that is designed particularly for use in hydraulic systems operating with water or oil, as well as some acids or other corrosive and caustic liquid-transmitting or operating lines, at working pressures up to one hundred p.s.i., and temperatures in the general range of seventy to one hundred forty degrees Fahrenheit.

An object of this invention is to provide a flow valve, as indicated, that is retained in leak-proof operation by utilization of line pressure to the valve, thereby obviating the need for springs, seating, seals, or other elements that may fail due to wear, breakage or corrosion.

Another object of the invention is to provide a valve, as characterized, that is reliable in use and provides reliable and dependable control of hydraulic cylinders, the draining of hydraulic lines in some areas while retaining other lines under pressure, and the control of flow in distribution lines of an hydraulic system in multiple series.

This invention also has for its objects to provide such means that are positive in operation, convenient in use, easily installed in a working position and easily disconnected therefrom, economical of manufacture, relatively simple, and of general superiority and serviceability.

The above objects are realized in a four-way valve structure comprising a four-ported body and a rotation stem fitted therein, both body and stem being advantageously formed of a resin or plastic known to the trade as polyvinyl chloride plastic, type II, or a comparable moldable or machinable resin, plastic or other suitable materials. The ports are radially arranged on a common plane around a central bore or chamber in the body, which bore is formed with a flatly conical seat that faces toward the bottom or back of the channel so as to be directed away from the plane on which the ports are located. The stem is provided with a conical face that conforms to and fits against the conical seat and, at all times, is biased toward said seat by the constant pressure from a fluid pressure source to one port of the four provided in the body. This port is the valve inlet. A second of said four ports is the outlet or drain port and is in communication only with flow received from the two other ports according to the setting of the valve stem for selective reception of flow to said two last-mentioned ports.

The valve above outlined keeps line pressure from reaching the mentioned seat by the simple provision of an O-ring to contain such pressure, and a similar O-ring obviates leakage around the valve stem to atmosphere. Except for said two O-rings and an optional actuating handle, the valve wholly comprises the resin or plastic material above mentioned.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a front elevational view of a four-ported, four-way valve according to the present invention.

FIG. 2 is a rear view thereof with a portion removed to show the interior of the valve.

FIGS. 3 and 4 are cross-sectional views taken, respectively, on the lines 3—3 and 4—4 of FIG. 2.

FIG. 5 is a rear view of the valve body.

FIG. 6 is a front view of the valve stem.

The valve that is illustrated is a four-port structure that comprises, generally, a body 10 and a stem 11 rotatively fitted therein. Said two valve components are preferably formed of polyvinyl chloride plastic, type II, or other suitable material, and at least at the faces thereof that are seatedly engaged, are accurately smooth.

The body 10 comprises a main part 12 that is preferably of cylindrical form with a rear seat 13 in which, after the stem 11 is assembled therein, is fitted and permanently secured a back plate 14 which forms a closure for a centrally axial chamber 15 in the body part 12. The inner face 16 of said plate 14 is set back to define a recess 17 that is in communication with and forms part of the chamber 15.

A set of four radial ports 18, 19, 20 and 21, preferably equally circumferentially spaced, is provided in the body part, the port 18 having a longitudinal extension 22 that opens to the recess 17 and, therefore, to the chamber 15, the port 18 having a radial inner passage extension 23 that opens to a reduced axial bore 24 that forms an extension of the chamber 15 and is open to the front of the body part 12, and the ports 20 and 21, respectively, having angular passage extensions 25 and 26 that open on a flatly conical seat 27 that is the portion of chamber 15 from which the bore 24 extends. In the arrangement of the ports 18 to 21 that is shown, the port 18 is the inlet or pressure port, the port 19 the outlet or exhaust port, and the ports 20 and 21 are the ports across which a closed-circuit system such as the opposite ends of an hydraulic cylinder may be connected.

In the present case, the valve stem 11 is movable between two positions—one position in which pressure fluid flows from inlet port 18 to the port 20 to propel the piston of an hydraulic cylinder in one direction while the fluid displaced by said piston flows to port 21 and then through port 19 to drain, and the other position in which pressure fluid flows from inlet port 18 to the port 21 to propel the piston of an hydraulic cylinder in the opposite direction while the fluid displaced by said piston flows to port 20 and then through port 19 to drain.

In order to obtain the selective flows, as above, the stem 11 is formed to have a flatly conical face 28 that fits the seat 27, a cylindrical enlargement 30 that extends rearwardly from the larger rearward edge of the face 28, a spacer projection 31 on the rearward end of the stem, smaller than the stem enlargement 30 and directed toward the face 16 of the back plate 14, a cylindrical extension 32 from the smaller edge of the conical face 28 and which projects through the bore 24 of the body part 12 and is adapted to be provided with a handle 33 by means of which the stem is movable from one described position to the other as limited by stops 34 and 35 provided on said body part, a passage 36 through the stem enlargement 30 and selectively registrable with the angular passage extensions 25 and 26 according to the moved position of the stem, an annular groove 37 in the stem extension 32 in register with the passage extension 23, and diametrically opposite channels 38 and 39 in the stem and open to the groove 37 to communicate the drain port 19 with the selective port 21 while the other selecting port 20 is in communication with the inlet port 18.

Assuming that the ports 20 and 21 are connected to opposite sides of a closed-circuit hydraulic system, with the stem 11 in the position shown, pressure fluid from port 18 flows through passage 22 into recess 17 and is effective to hydraulically press the face 28 of the stem against the seat 27. An O-ring 40 in a groove in the periphery of the stem enlargement 30 seals against pressure flow to the valve seat. The fluid in recess 17 continues through passages 36 and 25 and through the port 20 to one side of said closed-circuit system. The flow will cause displacement of fluid from the system to the port 21, then through passage 26 to the channel 39, and finally through groove 37 and passage 23 to the drain port 19.

When the stem is turned by means of the handle 33 to the stop 35, the passage 36 will be in register with the passage 26 and port 21, thereby providing pressure flow from inlet port 18 to the latter port. In this position, the channel 38 will be in register with the passage 25. Thus, the displaced flow from the closed-circuit system will enter port 20, and through said channel 28 exhaust to the drain port 19.

The only place of accurate sealing fit is between seat 27 and face 28. Thus, the stem parts 30 and 32 are of reduced diameter to have a loose fit in the body part 12. As described, the O-ring 40 seals the inlet pressure. An O-ring 41 is provided in the extension 32 of the stem to seal against leakage of the flow to the drain port 19.

A neutral position with the stem set midway between the two described positions closes flow from port 18 to the other ports 19, 20 and 21. This neutral position disconnects passage 36 and channels 38 and 39 from all of the ports.

The above-described valve may be effectively used for controlling sprinkler systems for large areas, such as golf courses, where one valve could be connected to control the entire system and cause operation thereof from one area to another merely by rotation of the valve stem from one outlet port to another and feeding a new line at each port until a full circle brings the valve to shut-off. In such case, the valve may have more than four ports and the stem modified accordingly. The principle of operation would remain the same as herein described.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A multiple port valve comprising:
 (a) a body having a closed back, an axial bore opening at the front end, and a cylindrical chamber bore coaxial with and larger than said bore and located between said back and bore,
 (b) a conical seat connecting said bore and chamber bore and facing toward the back of the body,
 (c) a first port in said body with a connecting passage opening into said chamber bore adjacent the back of the body,
 (d) a second port in said body phased 90° from the first port with a connecting passage opening into said front bore,
 (e) similar third and fourth ports in said body, each with a connecting passage opening on said conical seat, one diametrically opposite the first port and the other diametrally opposite the second port, and
 (f) a valve stem rotatively fitted into the front and chamber bores with the back end face thereof subject to the pressure of fluid from the first port and biased thereby in a forward direction,
 (g) said stem being provided with a conical face engaged with and pressed in a direction toward the conical seat in the body,
 (h) said stem having a passage extending from the end and conical faces to selectively connect the chamber bore and the second and third bores according to the rotated positions of the stem in the body, and
 (i) having diametrally arranged channels formed therein and open to said front bore in the body and communicating the third or fourth port, according to the rotated positions of the stem, with the second bore.

2. A multiple valve according to claim 1, provided with an O-ring around the stem between the mentioned faces thereof and in fluid-sealing engagement with the chamber bore, and a second O-ring around the portion of the stem that is fitted into the front chamber bore and in sealing engagement with the latter bore at the front end thereof.

3. A multiple valve according to claim 1 in which the front end of the stem, in register with the second port, is provided with an annular groove into which the mentioned channels of the stem open.

4. A multiple valve according to claim 1 in which the front end of the stem extends beyond the front of the body and is provided with a handle, and opposed stops on said body front to engage the handle and limit the rotative movement of the stem to an angle of 90° in either direction.

5. A multiple valve according to claim 1 in which both the body and the stem are formed of polyvinyl chloride plastic, type II.

6. A multiple valve according to claim 1 in which both the body and the stem are formed of a moldable, machinable plastic.

7. In a multiple valve according to claim 2, the four ports being disposed on a common plane rearward of the second O-ring.

No references cited.

M. CARY NELSON, *Primary Examiner.*

R. J. MILLER, *Assistant Examiner.*